(12) United States Patent
Allain et al.

(10) Patent No.: US 7,667,952 B2
(45) Date of Patent: Feb. 23, 2010

(54) CONNECTION SYSTEM BETWEEN CAPACITOR BATTERIES

(75) Inventors: Briag Allain, Saint Germain en Laye (FR); Phillipe Lebreton, Bezons (FR); Jean Frederic Sargos, Suresnes (FR)

(73) Assignee: Semikron, Sartrouville (FR)

( * ) Notice: Subject to any disclaimer, the term of this patent is extended or adjusted under 35 U.S.C. 154(b) by 298 days.

(21) Appl. No.: 11/791,138

(22) PCT Filed: Nov. 21, 2005

(86) PCT No.: PCT/FR2005/002890

§ 371 (c)(1),
(2), (4) Date: Jul. 12, 2007

(87) PCT Pub. No.: WO2006/053995

PCT Pub. Date: May 26, 2006

(65) Prior Publication Data

US 2008/0002328 A1    Jan. 3, 2008

(30) Foreign Application Priority Data

Nov. 22, 2004 (FR) .................................. 04 12385
Mar. 7, 2005 (FR) .................................. 05 02282

(51) Int. Cl.
*H01G 9/00* (2006.01)

(52) U.S. Cl. .................... 361/502; 361/503; 361/504; 361/508; 361/512; 361/303

(58) Field of Classification Search .................. 361/502, 361/503–504, 508–512, 540–541
See application file for complete search history.

(56) References Cited

U.S. PATENT DOCUMENTS

| 5,706,166 | A | * | 1/1998 | Schweikert et al. | ......... 361/520 |
|---|---|---|---|---|---|
| 6,268,996 | B1 | * | 7/2001 | Landsgesell | ................ 361/540 |
| 6,297,944 | B1 | * | 10/2001 | Schweikert | ................ 361/520 |
| 6,845,003 | B2 | * | 1/2005 | Oyama et al. | ................ 361/502 |
| 7,286,335 | B2 | * | 10/2007 | Hozumi et al. | ............... 361/502 |
| 7,307,830 | B2 | * | 12/2007 | Gallay et al. | ................ 361/502 |
| 7,474,520 | B2 | * | 1/2009 | Kashihara et al. | ........... 361/502 |
| 2003/0223179 | A1 | | 12/2003 | Mishima et al. | |

FOREIGN PATENT DOCUMENTS

| EP | 0 450 122 A1 | 10/1991 |
|---|---|---|
| EP | 1 339 077 A2 | 8/2003 |
| JP | A 1-181405 | 7/1989 |

* cited by examiner

*Primary Examiner*—Nguyen T Ha
(74) *Attorney, Agent, or Firm*—Oliff & Berridge, PLC

(57) ABSTRACT

The invention concerns a connection system between batteries or banks of capacitors associated with a circuit, for example of the inverter type and whereof the capacitors are connected by a busbar consisting of two thin bars of different polarities stacked and separated by an insulating layer. Each busbar comprises at least one protuberance designed to co-operate with a linking member between two protuberances derived from two batteries or banks of adjacent capacitors. The linking member comprises two conductive strips designed to be contacted each with the bars of same polarity of two opposite protuberances, said strips being arranged on either side of an insulating layer. One of the protuberances or of each co-operating zone of the linking member with one protuberance comprises a clamp forming a slide enabling the other to be slidingly positioned perpendicular to the axis of the link. Clamping/releasing means enable the linking member to be fixed to each protuberance, said means being maintained as one single assembly upon release.

12 Claims, 5 Drawing Sheets

CONNECTION SYSTEM BETWEEN CAPACITOR BATTERIES

BACKGROUND OF THE INVENTION

The invention concerns a connection system between batteries or banks of capacitors associated with a circuit, for example of the inverter type. These batteries are made up of several capacitors connected by a bus consisting of two thin bars or plates of different polarities stacked and separated by an insulating layer, according to the technology referred to as busbars. Such batteries may obviously be integrated into packaging arrangements having a broader function, in particular inverter packages, to take the example used above.

The connection between several capacitor batteries may, in fact, be imagined as the realization of a circuit by adding circuits portions, which may produce a globally inductive structure, in particular due to and at the level of the links. Making the connection between packages containing such batteries, because it leads to alternation of capacitive portions and inductive portions, means building a circuit of the oscillating type covered with parasitic harmonic currents which may affect the capacitors and shorten their lifetime.

The purpose of a connection system applied to such assemblies must therefore be primarily to reduce said currents and their possible oscillations inside capacitors.

Certain types of connections between capacitor banks used to date consist of metallic bars, whereof insulation is obtained simply by maintaining distance between the bars, there consequently being no insulation other than the mass of air found between them.

These metallic bars are then attached, for example by bolting, onto zones intended for this purpose in the capacitors to be connected. This technology is, however, strongly inductive, and thus creates oscillations which are harmful to the durability of the capacitors.

Other than the purely electrical problems already mentioned, there are also important mechanical aspects to consider in realizing this type of connection. Thus, given the significance of the currents crossing the conductive bars, it is important for the contact pressure of conductors of same polarity to be sufficient and correctly distributed. This obviously requires appropriate clamping means.

These means must be designed to facilitate both construction and system maintenance operations. To meet this goals, it is preferable for these clamping means to be designed such that they are easily attachable/detachable, in a reduced amount of time and without using parts that are too easily scattered.

In the connection devices of the prior art which use the rolled busbar technology mentioned above, meaning grouping two bar-type conductors of different polarities separated by insulating foil, to date the link to the pieces to be connected has been realized by screw/nut type means, the detachment of which is not easy. In fact, it involves the complete disassembly of the bolt, which is hardly quick and adds the risk of losing one of the parts.

SUMMARY

The purpose of the connection system of the invention resolves the various drawbacks mentioned above by proposing a technical solution which is satisfactory from an electrical perspective, meaning primarily having low inductivity, while also offering attachability/detachability to facilitate the work of operators as much as possible. This solution is also possible at a low cost, which makes it quite economically interesting.

Chiefly, the connection system of the invention, making it possible to link capacitor batteries of banks connected to rolled busbars, is characterized in that:
- each busbar (5) comprises at least one protuberance (6) designed to cooperate with a linking member (C) between two protuberances derived from two batteries or banks of adjacent capacitors (4);
- the linking member comprises two conductive strips designed to be contacted each with the bars of same polarity of two opposite protuberances, said strips being arranged on either side of an insulating layer;
- one of the protuberances (6) or of each cooperating zone of the linking member (C) with one protuberance (6) comprises a clamp forming a slide enabling the other to be slidingly positioned perpendicular to the axis of the link;
- clamping/releasing means (12, 13, 14) enable the linking member to be fixed to each protuberance, said means being maintained as one single assembly upon release.

This new solution proposes the advantages of the rolled busbar technology, meaning that it essentially involves a connection with low inductivity, and makes it possible to connect and disconnect the packages from each other very quickly due to the existence of slides which make it possible to insert/remove the system of the invention after a simple release while still maintaining the clamping means as one single assembly. Moreover, the invention, as we shall see, uses only elementary parts with low production costs, making the entire system inexpensive to produce.

According to a first configuration, each protuberance comprises a clamp obtained by distancing, while keeping them parallel, the bars of the busbar at the end of the protuberance, the slide thus formed being proportioned to receive an edge area of a parallelepiped-type insulating package, one other edge of which is inserted into the similar opposite protuberance, said package being connected through the clamping/releasing means to the two strips of the linking body bearing upon the exterior surfaces of the clamps, said clamping/releasing means being located between the clamps.

In this variation, the clamping/releasing means are part of the linking member, whereof the two strips and intermediary insulation block make up a sandwich structure which participates in the sliding and is designed to ensure good contact pressure.

In this case, preferably, the clamping/releasing means consist of at least one screw going through the strips and the insulation block, a bushing being placed between said screw and at least one strip of the linking member as well as the bars of the protuberances it connects.

The screws of the clamping/releasing means are therefore not likely to cause short circuits.

Clamping may, for example, be done using a bolt bearing on the exterior surface of the other strip, or by fixing in a threading of the latter.

This type of fixing, combined with relative positioning and the shape of the parts of the linking member, enable easy assembly/disassembly while also ensuring high-performance electrical contacts.

These characteristics are also improved by the fact that, preferably, the two strips are notched or indented on their surface that is in contact with the bars of the protuberances.

So that the central part is as limited as possible, it is furthermore advantageous for the clamping/releasing means to consist of two screws arranged following an axis perpendicular to the direction of the link.

According to an alternative configuration, that of the protuberance or the cooperating zone of the linking member with the protuberance which does not comprise a clamp has a transverse cut made perpendicular to the axis of the link, in which clamping/releasing means related to each clamp may slide.

The clamping means then also consist of a screw and a bolt, the screw going through one of the conductors of the clamp through an orifice equipped with a bushing, and the bolt being coaxial and integral with the other conductor, the bushing having a portion extending in the clamp over a length greater than the thickness of the conductor to the contact of that of the clamp which the bushing goes through, this portion being inserted in the transverse cut.

The element which goes through the branches of the clamp of the connection system of the invention is therefore made up of the rod of the screw, at least partially surrounded, in the interior housing of said clamp, by the bushing.

The transverse cut not only enables the passage of the screw and the bushing, but also easy assembly/disassembly by guided movement in the cut after releasing the screw. The bolt being integral with one of the branches of each clamp, action on the head of the screw, consequently in just one place, is sufficient to enable clamping/releasing. Furthermore, rotating several turns is sufficient, which makes assembly/disassembly very easy and quick. The clamping/releasing unit then remains assembled, which makes it impossible to lose any parts, as is also the case in the first configuration.

The bushing comprises a portion having a diameter greater than the orifice through the conductor of the clamp, in which the head of the screw bears and which makes it possible to distribute the clamping pressure over a greater surface.

Also preferably, the transverse cut is designed with a length such that when the bushing abuts its blind end, the linking member is centered, axially, on the protuberance of each busbar.

This cut therefore also plays a role in positioning by enabling immediate centering of the connecting tab in the axis of the protuberances of the busbars exceeding the capacitive blocks to be connected.

The width of this cut is designed to enable translational guiding of the linking member/protuberance, in that it is designed to be slightly greater than the diameter of the portion of the bushing which occupies it. The resulting guiding facilitates the task of the operator, in particular during assembly, reducing the time necessary for operation.

In the invention, the clamp may be found on the protuberance, and the cut is then located at the end of the linking member. The inverse is also possible.

Preferably, according to one possible configuration, the linking member comprises a first flat rectilinear strip and a second strip having ends which are parallel and offset relative to the central portion coupled to the first strip, delimiting two housings forming parallelepiped-type end clamps. These make it possible to house the protuberances of the busbars protruding outwardly from the adjacent capacitor batteries to be connected, such that the exterior surfaces of said protuberances and the interior surfaces of the strips are practically in contact before clamping. The aforementioned clamping means connect the two branches of the end clamps.

All of the elements involved in the composition of these two configurations are easy to manufacture, using regular materials, and are able to be produced inexpensively.

The geometric configuration of the linking member respects the small distance separating the conductors of "+" and "−" polarities, and makes it possible to meet the objective of low inductivity of this portion of the circuit. The rolled busbar technology, which characterizes the rest of the circuit, is in fact generalized for the design of said members of the invention.

BRIEF DESCRIPTION OF THE DRAWINGS

The invention will now be described in more detail, using the two configurations described above as examples and in reference to the annexed figures, in which.

DETAILED DESCRIPTION OF EMBODIMENTS

Figure 1:
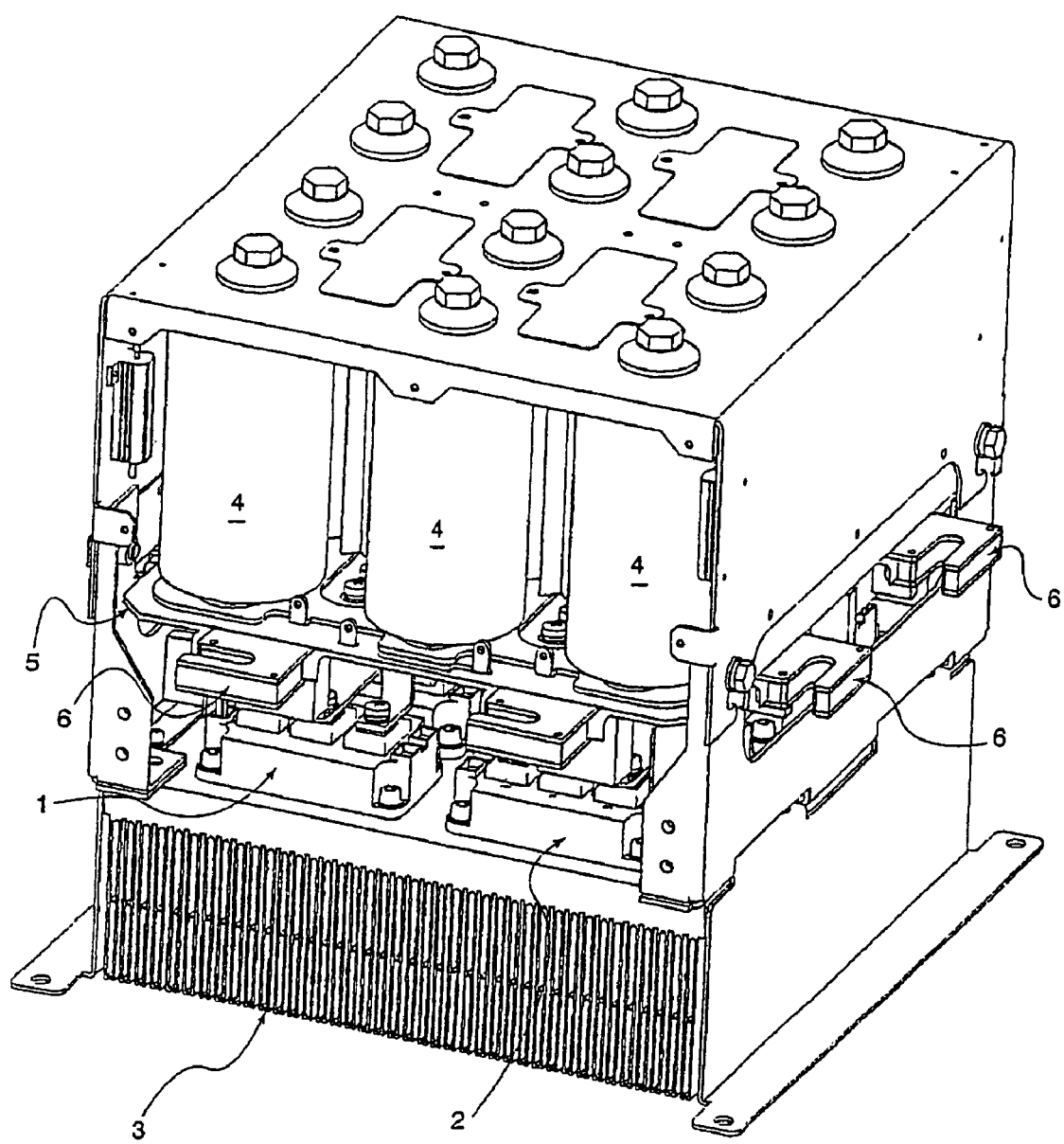
FIG. 1 is a perspective view of an inverter type module topped with a bank of electrolytic capacitors.

In reference to FIG. 1, the IGBT modules (1) and (2) form, with other elements realizing an inverter, a median layer arranged between a radiator (3) enabling heat dissipation and an upper capacitive block made up of electrolytic capacitors (4) welded or assembled to a flat plate forming a busbar (5). This latter is consequently made up of two thin, conductive, flat bars linked to two different polarities of capacitors, and separated by an insulating layer.

This bipolar busbar is provided, on its four sides, with protuberances (6) which protrude outwardly from the volume of the capacitive block and enable the connection of the inverter module to other identical modules.

Figure 2:
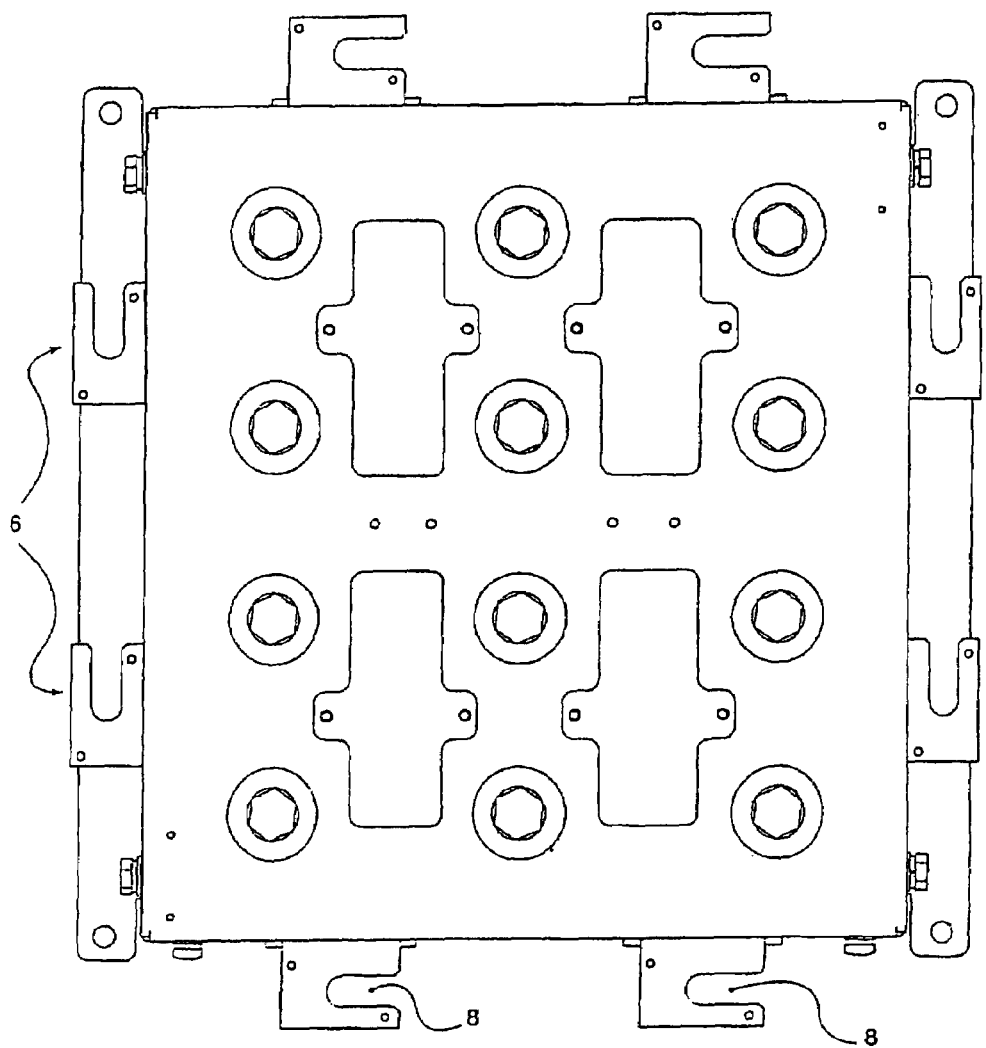
FIG. 2 is a top view.

FIG. 2 more clearly illustrates the shape of the protuberances (6) protruding outwardly from all sides, which are provided with a lateral slide (8) cut enabling positioning of the connection systems between modules (see FIG. 3), and in particular cooperating with the clamping means of said systems.

In the example of the inverter module shown in FIGS. 1 and 2, the battery of the capacitors comprises twelve capacitors (4) which may therefore be linked on at least one side, through two connection systems according to the invention, to at least one other battery also comprising twelve electrolytic capacitors (4).

Figure 3:
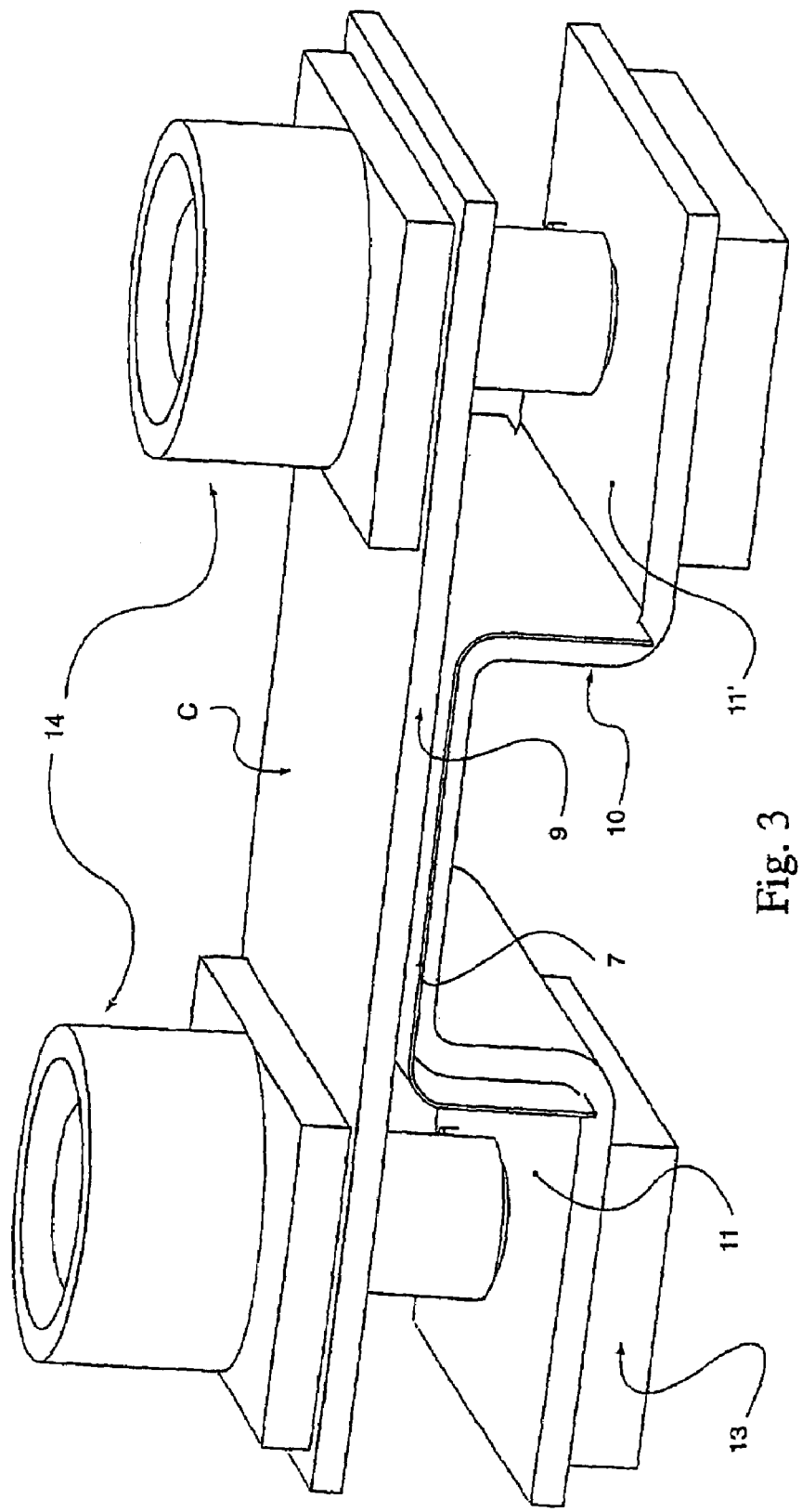
FIG. 3 shows a connection system according to one of the two embodiments of the present invention.

The connection system (C) appears more precisely in FIG. 3. It is made up, in the specific configuration illustrated in this figure, of two conductive strips (9) and (10), one of which is flat and rectilinear (strip 9) while the other (strip 10) has a median slot which makes it possible to offset its ends such that the connection system (C) of the invention presents two opposing clamps between the branches of which is the opening of a housing (11, 11') for the protuberances (6) protruding outwardly from the busbar (5). An insulating layer (7) separates the strips (9, 10) in their median portions.

Clamping means go through the housings (11, 11'), these clamping means being made up of a screw (12), a bolt (13) and a bushing (14). Each bolt (13) is made integral with the strip (10), and tightening the screw (12) consequently results in bringing the two branches of each clamp closer together. The head of the screw (12) bears on a strip (9) through an enlarged portion of the bushing (14), the function of which, other than enabling this bearing and guiding of the screw, consists primarily of preventing a short-circuit between the two bars of the busbar (5) on one hand, and the two strips (9, 10) of the connection system (C) of the invention on the other hand.

This connection system (C) makes it possible to maintain a reduced level of inductance, even when several capacitive blocks are connected to each other. The use of a technology in these connectors which uses the essential principles of the technology used in the bars/bus inside capacitive blocks makes this low-inductivity connection possible.

The part of the guide bushings (14) having the greater diameter also makes it possible to distribute the contact pressure between the strip (9) and the bar of the protuberance (6) which is across from and in contact with it. For the strip (10), better distribution of pressure is obtained thanks to the existence of the bolt (13) which is integral with it. The end clamps and clamping means therefore have a combined action which enables good quality surface contact with the protuberances (6), for both polarities.

Mechanically, the connection/disconnection is made by one action on each screw head (12), by means of very quick and simple limited clamping/releasing. The screw, which is never completely removed from the bolt, cannot be lost, which constitutes an additional advantage of the invention.

Figure 4:
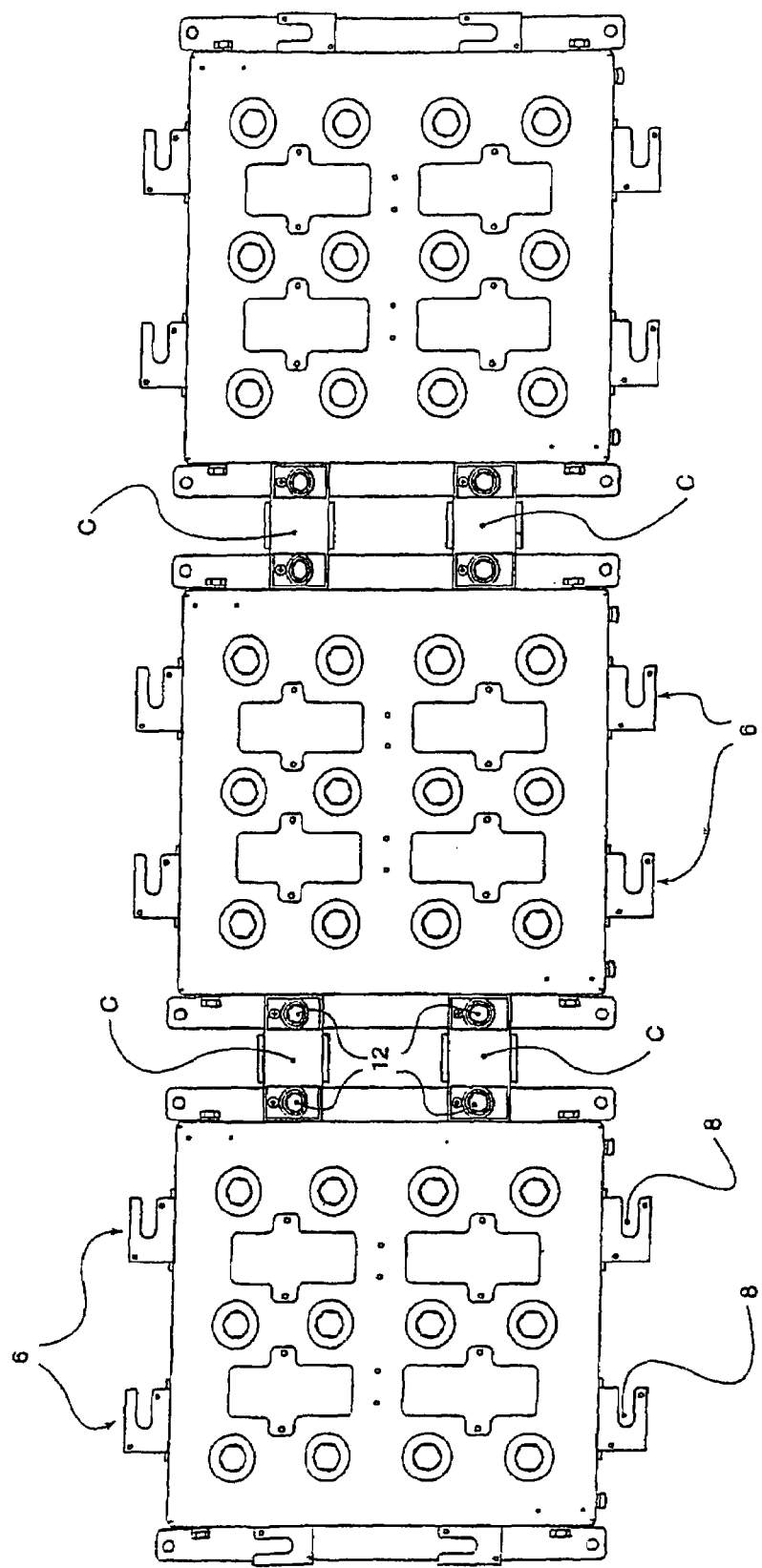
FIG. 4 shows, in a top view, the linking of several modules with the help of connection systems according to FIG. 3.

FIG. 4 provides an example of the connection of several (three) inverter packages to each other, with the help of connection systems. (C) of the invention attached to each package with the help of two screws (12). Given the existence of protuberances (6) on four sides of the packages, numerous assembly configurations are possible. The cubic volume of the inverter packages, which presents a dual symmetry relative to two perpendicular planes, also increases the number of possible configurations.

Figure 5:
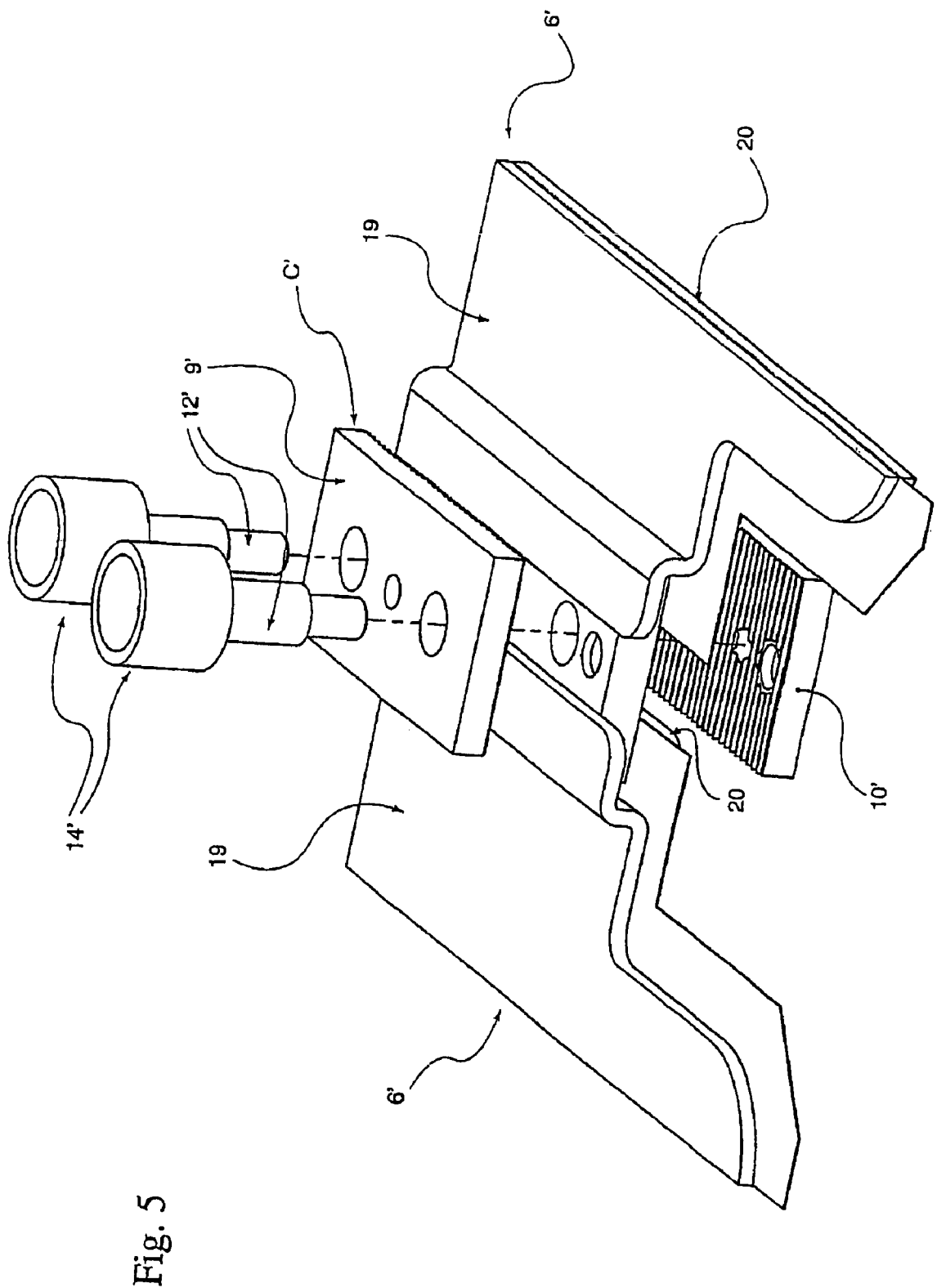
FIG. 5 shows an exploded perspective view of another possible configuration of the invention.

FIG. 5 shows another possible configuration, according to which the clamps are disposed at the ends of the protuberances (6') protruding outwardly from the modules, for example as shown in FIG. 1.

In this case, the conductive bars (19, 20) of the busbar are stepped and flat respectively, constituting an end slide in which an insulation block (7') can slide. The strips (9', 10') of the linking system (C') also play a role in sliding, when the clamping means are in the released position, meaning unclamped, and the strips (9', 10') remain in contact with the exterior surfaces, upper (19) and lower (20), respectively, of the protuberances (6').

The clamping/releasing means, also using bushings (14'), are identical to those used in the version previously explained, and consequently do not require additional explanation. The screws (12') and bolts, the latter not being visible, are used under the same conditions.

According to one possibility, the surfaces of the strips (9', 10') in contact with the bars (19, 20) of the busbar are notched to ensure a good connection while still keeping a correct contact surface.

The existence of these two configurations shows, if necessary, that it is possible to design multiple embodiments without going beyond the scope of the present invention.

The invention claimed is:

1. Connection system between batteries or banks of capacitors associated with a circuit, for example of the inverter type, and whereof the capacitors are connected by a busbar consisting of two thin bars of different polarities stacked and separated by an insulating layer, characterized in that:
   each busbar comprises at least one protuberance designed to cooperate with a linking member between two protuberances derived from two batteries or banks of adjacent capacitors;
   the linking member comprises two conductive strips designed to be contacted each with the bars of same polarity of two opposite protuberances, said strips being arranged on either side of an insulating layer;
   one of the protuberances or of each cooperating zone of the linking member with one protuberance comprises a clamp forming a slide enabling the other to be slidingly positioned perpendicular to the axis of the link;
   clamping/releasing means enable the linking member to be fixed to each protuberance, said means being maintained as one single assembly upon release.

2. Connection system between batteries of capacitors according to claim 1, wherein each protuberance comprises a clamp obtained by distancing, while keeping them parallel, the bars of the busbar at the end of the protuberance, the slide thus formed being proportioned to receive an edge area of a parallelepiped-type insulating package, one other edge area of which is inserted into the similar opposite protuberance, said package being connected through the clamping/releasing means to the two strips of the linking member bearing upon the exterior surfaces of the clamps, said clamping/releasing means being located between the clamps.

3. Connection system between batteries of capacitors according to claim 2, wherein the clamping/releasing means consist of at least one screw going through the strips and the insulation block, a bushing being placed between said screw and at least one strip of the linking member as well as the bars of the protuberances it connects.

4. Connection system between batteries of capacitors according to claim 3, wherein clamping is done by a bolt bearing on the exterior surface of the other strip, or by fixing in a threading of the latter.

5. Connection system between batteries of capacitors according to claim 3, wherein the clamping/releasing means consist of two screws arranged following an axis perpendicular to the direction of the link.

6. Connection system between batteries of capacitors according to claim 2, wherein the two strips are notched or indented on their surface that is in contact with the bars of the protuberances.

7. Connection system between batteries of capacitors according to claim 1, wherein that of the protuberance or the cooperating zone of the linking member with the protuberance which does not comprise a clamp has a transverse cut made perpendicular to the axis of the link, in which clamping/releasing means related to each clamp may slide.

8. Connection system between batteries of capacitors according to claim 7, wherein the clamping means consist of a screw and a bolt, the screw going through one of the conductors of the clamp through an orifice equipped with a bushing, and the bolt being coaxial and integral with the other conductor, the bushing having a portion extending in the clamp over a length greater than the thickness of the conductor to the contact of that of the clamp which the bushing goes through, this portion being inserted in the transverse cut.

9. Connection system between batteries of capacitors according to claim 8, wherein the bushing comprises a portion having a diameter greater than the orifice through the conductor of the clamp, in which the head of the screw bears and which makes it possible to distribute the clamping pressure over a greater surface.

10. Connection system between batteries of capacitors according to claim 8, wherein the transverse cut is designed with a length such that when the bushing abuts its blind end, the linking member is centered, axially, on the protuberance of each busbar.

11. Connection system between batteries of capacitors according to claim 8, wherein the size of this cut is designed to enable translational guiding of the linking member protuberance, in that it is designed to be slightly greater than the diameter of the portion of the bushing which occupies it.

12. Connection system between batteries of capacitors according to claim 7, wherein the linking member comprises a first flat rectilinear strip and a second strip whereof the ends are parallel offset relative to the central portion coupled to the first strip, delimiting two housings with parallelepiped-type ends making it possible to house the protuberances of the busbars protruding outwardly from the adjacent capacitor batteries to be connected, the exterior surfaces of the protuberances and the interior surfaces of the strips being practically in contact before clamping.

* * * * *